May 24, 1938.   I. G. FOWLER   2,118,183
APPARATUS FOR USE IN TREATING GLASS SHEETS
Filed Dec. 24, 1934
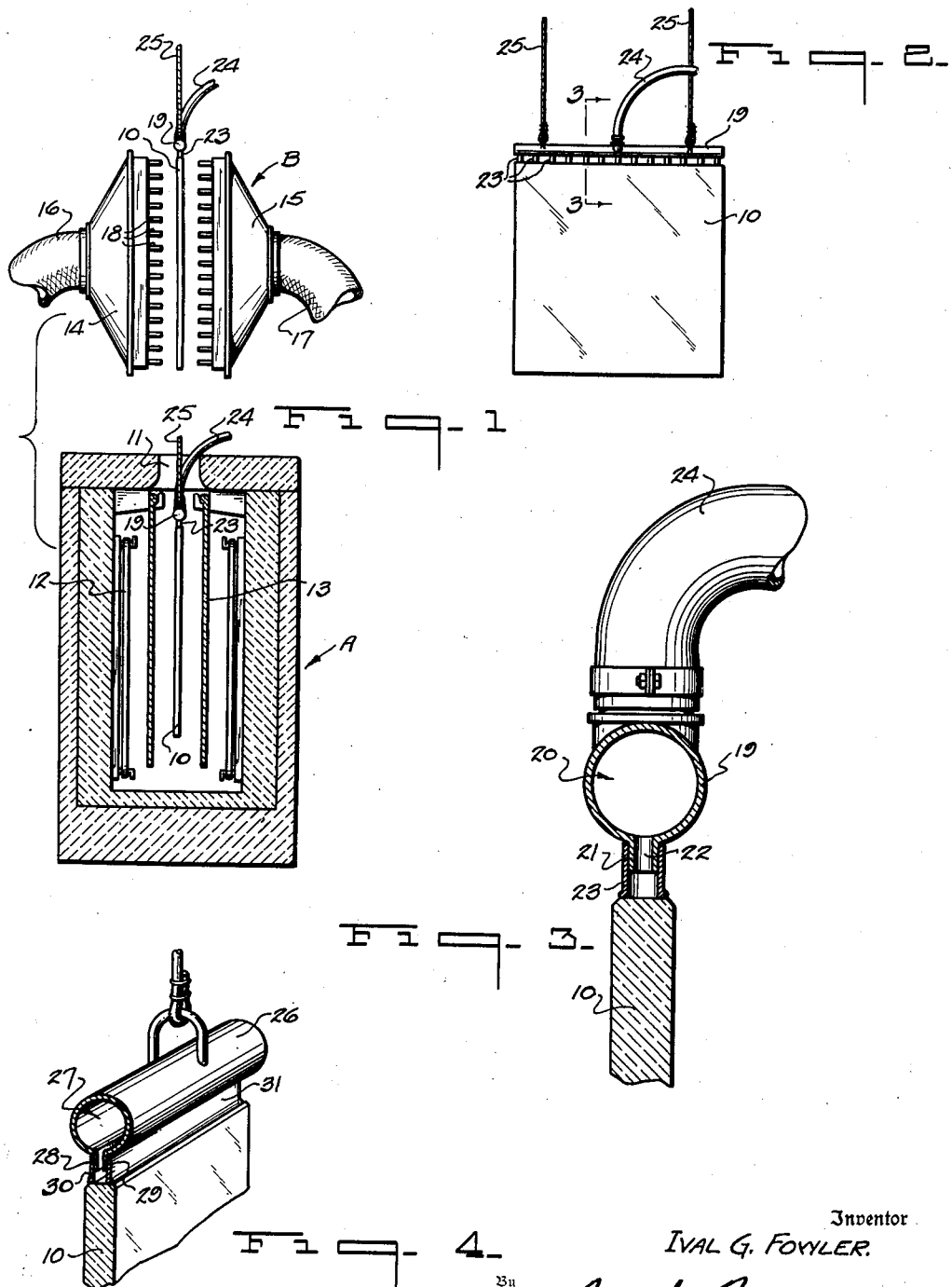
Inventor
IVAL G. FOWLER.
By Frank Fraser
Attorney Patented May 24, 1938

2,118,183

UNITED STATES PATENT OFFICE 2,118,183

APPARATUS FOR USE IN TREATING GLASS SHEETS

Ival G. Fowler, Toledo, Ohio, assignor to Libbey-Owens-Ford Glass Company, Toledo, Ohio, a corporation of Ohio Application December 24, 1934, Serial No. 758,982

2 Claims. (Cl. 294—64)

The present invention relates to the art of tempering or hardening sheet glass and more particularly to an improved method and apparatus for supporting the glass sheets during the treatment thereof.

In the case hardening of glass sheets according to one well known process, the sheets are first heated to approximately the point of softening of the glass and then suddenly chilled to place the outer surfaces of the said sheets under compression and the interiors thereof under tension. The treatment of glass sheets in this manner not only materially increases the mechanical strength of the glass but further modifies its breaking characteristics in that when broken, the glass sheet will disintegrate into innumerable small and relatively harmless particles instead of breaking into large dangerous pieces or slivers as is the case with ordinary glass sheets.

In the practice of the above process, the glass sheets are ordinarily maintained in a vertical position during the treatment thereof and it is customary to suspend the sheet from a plurality of relatively small tongs or hooks which engage opposite faces of said sheet near its upper edge. The supporting of the sheet in this manner is, however, open to objection due to the fact that when the glass is heated, the points of the tongs or hooks bite into the softened sheet causing slight indentations or depressions therein and which remain in the sheet and are quite noticeable after hardening. The marring of the glass sheet in this manner would not be so objectionable were it possible to trim the sheet after hardening but glass so hardened cannot be subsequently cut since any attempt at cutting would cause a complete shattering of the sheet.

The aim and object of this invention therefore is the provision of an improved method and apparatus for supporting the glass sheet during the hardening thereof in such a manner that the said sheet will not be marred or defaced by the supporting means.

Another object of the invention is the provision of a novel method and apparatus wherein the use of hooks or tongs for supporting the glass sheet is obviated and the said sheet supported by suction.

A further object of the invention is the provision of such a method and apparatus whereby the sheet is suspended during treatment in a vertical position by the application of suction to the upper edge thereof.

Other objects and advantages of the invention will become more apparent during the course of the following description when taken in connection with the accompanying drawing.

In the drawing wherein like numerals are employed to designate like parts throughout the same, Fig. 1 is a view of one form of tempering apparatus illustrating the present invention in use, the means for heating the sheet being shown in section and the cooling means in elevation, Fig. 2 is a side elevation of the improved sheet supporting means provided by the present invention, Fig. 3 is a transverse section taken substantially on line 3—3 in Fig. 2, and Fig. 4 is a perspective sectional view of a slightly modified form of sheet supporting means.

As brought out above, in the practice of one well known process for hardening glass sheets, the said sheets are first heated to approximately the point of softening of the glass and then suddenly chilled to place the outer surfaces of the sheets under compression and the interiors thereof under tension.

In the embodiment illustrated in the drawing, the means for heating the glass sheets comprises a furnace designated in its entirety by the letter A, while the means for subsequently chilling or cooling the sheets is designated generally by the letter B. The cooling means B is preferably arranged directly above the furnace A so that the glass sheet 10, after being heated within the furnace, can be transferred directly to the cooling means without any undue loss of heat and without being adversely affected by atmospheric conditions during the transfer.

The furnace A is preferably of the electrically heated type and is provided with a top opening 11 through which the glass sheets 10 to be treated may be inserted and removed. Any suitable covering can be used for the opening 11 as will be readily understood. For the purpose of heating the furnace, electrical heating elements 12 may be used in conjunction with baffle plates 13 and by means of any conventional indicating and control mechanism the temperature of the furnace can be regulated to heat the glass sheet 10 to approximately its point of softening which is ordinarily in the neighborhood of 1250° F. for flat glass.

When the glass sheet has been heated to the desired temperature within the furnace, it is lifted therefrom through the top opening 11 and subjected immediately to the action of the cooling means B, said means comprising spaced blower heads 14 and 15 connected by means of flexible conduits 16 and 17 respectively to suitable blowers so that blasts of air can be directed simultaneously upon opposite surfaces of the glass sheet when brought into position between the said blower heads. Each blower head may be provided with a plurality of nipples 18 through which jets of air are directed against the sheet.

It will of course be appreciated that the invention is not limited to the specific type of means disclosed herein for heating and cooling the glass sheets.

As pointed out above, it has been heretofore customary to support the glass sheet during the heating and cooling thereof by means of relatively small hooks or tongs which engage opposite surfaces of the sheet closely adjacent its upper edge so that the said sheet is suspended therefrom. Also, the use of such supporting means has tended to mar or disfigure the glass when softened as a result of the heating thereof. The aim of this invention is to avoid the use of tongs or hooks and provide, in lieu thereof, means which will effectively support the glass sheet during treatment without in any way marring or injuring the same.

With reference particularly to Figs. 1, 2 and 3, the means disclosed therein for supporting the glass sheet 10 comprises a header 19 consisting of a horizontally disposed pipe closed at its opposite ends to provide a chamber 20 therein and being further provided with a plurality of spaced parallel depending nipples 21 having openings 22 which communicate with chamber 20. Fitted over each of the nipples 21 is a relatively short tubular member 23, preferably of asbestos or the like, said tubular members being adapted to engage the upper edge of the glass sheet 10 as clearly shown in Fig. 3. Also carried by the header 19 and communicating with the chamber 20 therein is a flexible conduit 24 connected with a suitable vacuum producing means.

In operation, when it is desired to support a sheet of glass 10 to be hardened, the upper edge of the said sheet is first brought into engagement with the outer open ends of the tubular members 23, after which the air is exhausted from the chamber 20 through the conduit 24 to create a suction within said chamber and which suction, acting upon the sheet edge is adapted to hold the sheet firmly in engagement with the tubular members. The sheet can then be lowered into the furnace A by means of cables 25 fastened to the header 19 and, after being heated, can be lifted upwardly into position between the blower heads 14 and 15.

In the event the header 19 is relatively longer than the width of the glass sheet to be treated, the tubular members 23 which are beyond the side edges of the sheet may be suitably closed or plugged up so that the same header may be used for supporting sheets of different widths.

In Fig. 4 there has been illustrated a slightly modified type of sheet supporting means wherein the header 26 instead of being provided with a plurality of nipples, as above described, is formed with spaced flanges 28 and 29 to provide a slot therebetween which communicates with the chamber 27 in header 26. Secured to these flanges are strips 30 and 31 of asbestos or the like and which engage the upper edge of the glass sheet 10 in the same manner as the tubular members 23.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for supporting a glass sheet in a vertical position during tempering, including means comprising a header provided with spaced flanges to define a slot therebetween, means carried by said flanges and engaging the upper edge of the glass sheet, and means connected with said header affording communication with a vacuum producing means for creating a suction within the header acting upon the sheet to hold the same in engagement with said sheet edge engaging means.

2. Apparatus for supporting a glass sheet in a vertical position during tempering, including means comprising a tubular member provided with spaced outwardly projecting flanges extending longitudinally thereof to define a slot therebetween, means carried by said flanges and engaging the upper edge of the glass sheet, and means connected with the tubular member affording communicating with a vacuum producing means for creating a suction within the tubular member acting upon the sheet to hold the same in engagement with said sheet edge engaging means.

IVAL G. FOWLER.